(12) United States Patent
Aihara et al.

(10) Patent No.: US 9,637,621 B2
(45) Date of Patent: May 2, 2017

(54) DIP-FORMING COMPOSITION AND DIP-FORMED ARTICLE

(71) Applicant: ZEON CORPORATION, Tokyo (JP)

(72) Inventors: Shunjin Aihara, Tokyo (JP); Yoshiyuki Nakamura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/909,616

(22) PCT Filed: Sep. 26, 2014

(86) PCT No.: PCT/JP2014/075549
§ 371 (c)(1),
(2) Date: Feb. 2, 2016

(87) PCT Pub. No.: WO2015/046391
PCT Pub. Date: Apr. 2, 2015

(65) Prior Publication Data
US 2016/0168366 A1    Jun. 16, 2016

(30) Foreign Application Priority Data
Sep. 30, 2013   (JP) ................................ 2013-203413

(51) Int. Cl.
*C08L 9/10*   (2006.01)
*C08K 3/22*   (2006.01)
*C08L 33/02*   (2006.01)

(52) U.S. Cl.
CPC   *C08L 9/10* (2013.01); *C08K 3/22* (2013.01); *C08L 33/02* (2013.01)

(58) Field of Classification Search
CPC .............. C08L 9/10; C08L 33/02; C08K 3/22
USPC ........................................................ 524/432
See application file for complete search history.

(56) References Cited

U.S. PATENT DOCUMENTS

| | | |
|---|---|---|
| 2002/0173563 A1 | 11/2002 | Wang et al. |
| 2004/0169317 A1 | 9/2004 | Wang et al. |
| 2008/0030924 A1* | 2/2008 | Mori ............... H01G 11/38 361/502 |
| 2009/0326102 A1 | 12/2009 | Wang et al. |
| 2011/0203596 A1 | 8/2011 | Wang et al. |

FOREIGN PATENT DOCUMENTS

| | | | |
|---|---|---|---|
| JP | 2003-246891 A | 9/2003 | |
| JP | 2004-532752 A | 10/2004 | |
| JP | WO 2010098008 A1 * | 9/2010 | ........... B29C 41/003 |
| JP | 5472286 B2 * | 4/2014 | ........... B29C 41/003 |
| WO | 2010/098008 A1 | 9/2010 | |

OTHER PUBLICATIONS

JP 5472286 B2—machine translation.*
Apr. 5, 2016 International Preliminary Report on Patentability issued in International Patent Application No. PCT/JP2014/075549.
Jan. 6, 2015 International Search Report issued in International Patent Application No. PCT/JP2014/075549.

* cited by examiner

*Primary Examiner* — Ling Choi
*Assistant Examiner* — Ronald Grinsted
(74) *Attorney, Agent, or Firm* — Oliff PLC

(57) ABSTRACT

A dip-forming composition which contains a weight average molecular weight 10,000 to 5,000,000 synthetic polyisoprene latex, a polycarboxylic acid and/or salt of a polycarboxylic acid, a sulfur-based vulcanizer, and a vulcanization accelerator is provided. According to the invention, a dip-forming composition which can suppress formation of coarse coagulum during aging and which can give a dip-formed article which is excellent in tensile strength and elongation even when the aging temperature is relatively low and the aging time is relatively short and, further, has excellent safety even when used in contact with the human body can be provided.

7 Claims, No Drawings

DIP-FORMING COMPOSITION AND DIP-FORMED ARTICLE

TECHNICAL FIELD

The present invention relates to a dip-forming composition which contains a latex of synthetic polyisoprene and a dip-formed article obtained by dip-forming the dip-forming composition.

BACKGROUND ART

In the past, it has been known to dip-form a dip-forming composition which contains a natural latex such as a latex of natural rubber to obtain a nipple, balloon, glove, medical balloon, sack, or other dip-formed article which is used in contact with the human body. However, a latex of natural rubber contains proteins which cause allergic reactions in the human body, so sometimes there was a problem as a dip-formed article which directly contacts the mucous membrane or organs of the body. Therefore, studies have been made on the use of a latex of a synthetic acrylonitrile-butadiene copolymer rubber or polyisoprene.

For example, Patent Document 1 discloses a dip-formed article which is obtained by dip-forming a dip-forming composition which comprises a latex of an acrylonitrile-butadiene copolymer rubber which contains ethylenically unsaturated acid monomer units in which sulfur and a vulcanization accelerator which comprises zinc oxide and a thiazole compound are mixed. The dip-formed article of Patent Document 1 does not contain any protein which can cause allergic reactions in the human body, but has a high stress at the time of 300% stretching and is not satisfactory in the point of flexibility.

Further, Patent Document 2 discloses a dip-forming composition which comprises a latex of synthetic polyisoprene in which sulfur, zinc oxide, a specific vulcanization accelerator, and a dispersant are mixed. The dip-forming composition which is disclosed in this Patent Document 2 can give a dip-formed article which is flexible and is excellent in tensile strength. In this Patent Document 2, an alkali earth metal salt of casein is used as a dispersant. Casein is one type of protein and is liable to cause allergic reactions in the human body.

Here, the dip-forming composition which contains a latex of synthetic polyisoprene is usually used for dip-forming after being aged for a suitable time period (also sometimes called "prevulcanization") so as to maintain the tensile strength of the obtained dip-formed article stably high.
However, in the art of the above-mentioned Patent Document 2, when not mixing in an alkali earth metal salt of casein as a dispersant, the are the problem that unless the aging time is made longer, the obtained dip-formed article ends up becoming inferior in tensile strength and the problem that the latex of the synthetic polyisoprene ends up falling in dispersion stability and coarse coagulum form during aging resulting in use for dip-forming ending up becoming difficult.

PRIOR ART DOCUMENTS

Patent Documents

Patent Document 1: Japanese Patent Publication No. 2003-246891A

Patent Document 2: Japanese Patent Publication No. 2004-532752A

DISCLOSURE OF THE INVENTION

Problem to be Solved by the Invention

The present invention has as its object the provision of a dip-forming composition which can suppress formation of coarse coagulum during aging and which can give a Hip-formed article which is excellent in tensile strength and elongation even when the aging temperature is relatively low and the aging time is relatively short and, further, has excellent safety even when used in contact with the human body.

Means for Solving the Problems

The inventors engaged in in-depth research to solve the above problem and as a result discovered that the above object can be achieved by mixing a polycarboxylic acid and/or salt of a polycarboxylic acid into a dip-forming composition which contains a weight average molecular weight 10,000 to 5,000,000 synthetic polyisoprene latex, a sulfur-based vulcanizer, and a vulcanization accelerator and thereby completed the present invention.

That is, according to the present invention, there is provided a dip-forming composition which contains a weight average molecular weight 10,000 to 5,000,000 synthetic polyisoprene latex, a polycarboxylic acid and/or salt of a polycarboxylic acid, a sulfur-based vulcanizer, and a vulcanization accelerator.

Preferably, the polycarboxylic acid and/or salt of a polycarboxylic acid is a polymer which is polymerized using an oil-soluble polymerization initiator or salt of the polymer.

Preferably, the polycarboxylic acid is a homopolymer of a methacrylic acid and the salt of a polycarboxylic acid is a metal salt of a homopolymer of a methacrylic acid, and the metal salt is a sodium salt.

Preferably, the polycarboxylic acid and/or salt of a polycarboxylic acid has a weight average molecular weight of 1,000 to 300,000.

Preferably, a content of the polycarboxylic acid and/or salt of a polycarboxylic acid is 0.01 to 20 parts by weight with respect to 100 parts by weight of the synthetic polyisoprene.

Further, the dip-forming composition of the present invention preferably further contains zinc oxide.

Further, according to the present invention, there is provided a dip-formed article obtained by dip-forming the above dip-forming composition.

Effects of the Invention

According to the present invention, it is possible to provide a dip-forming composition which can suppress formation of coarse coagulum during aging and which can give a dip-formed article which is excellent in tensile strength and elongation even when the aging temperature is relatively low and the aging time is relatively short and, further, has excellent safety even when used in contact with the human body, and a dip-formed article which is obtained by dip-forming the dip-farming composition, which is excellent in tensile strength and elongation, and which has excellent safety even when used in contact with the human body.

DESCRIPTION OF EMBODIMENTS

The dip-forming composition of the present invention contains a weight average molecular weight 10,000 to 5,000,000 synthetic polyisoprene latex, a polycarboxylic acid and/or salt of a polycarboxylic acid, a sulfur-based vulcanizer, and a vulcanization accelerator.

Synthetic Polyisoprene Latex

The synthetic polyisoprene latex used in the present invention is a latex of a synthetic polyisoprene with a weight average molecular weight of 10,000 to 5,000,000 which is obtained by polymerization of isoprene.

The synthetic polyisoprene may also be one obtained by copolymerization with another ethylenically unsaturated monomer which can copolymerize with isoprene. The content of the isoprene units in the synthetic polyisoprene, from the viewpoint of the ease of obtaining a dip-formed article which is flexible and superior in tensile strength, is preferably 70 wt % or more with respect to the total monomer units, more preferably 90 wt % or more, furthermore preferably 95 wt % or more, particularly preferably 100 wt % (homopolymer of isoprene).

As the other ethylenically unsaturated monomer which can copolymerize with isoprene, for example, butadiene, chloroprene, 1,3-pentadiene, and other conjugated diene monomers other than isoprene; acrylonitrile, methacrylonitrile, fumaronitrile, α-chloroacrylonitrile, and other ethylenically unsaturated nitrile monomer; styrene, alkylstyrene, and other vinyl aromatic monomers; methyl(meth)acrylate, ethyl(meth)acrylate, butyl(meth)acrylate, 2-ethylhexyl (meth)acrylate, and other ethylenically unsaturated carboxylic acid ester monomers; may be mentioned. Note that, these other ethylenically unsaturated monomers which can copolymerize with isoprene may be used as single type alone or as a plurality of types together.

As the isoprene units in the synthetic polyisoprene, according to the bonding state of the isoprene, four types of cis-bond units, trans-bond units, 1,2-vinyl-bond units, and 3,4-vinyl bond units are present. In the present invention, from the viewpoint of the obtained dip-formed article being able to be further improved in tensile strength, the ratio of content of the cis-bond units in the isoprene units which are contained in the synthetic polyisoprene is preferably 70 wt % or more with respect to the total isoprene units, more preferably 90 wt % or more, particularly preferably 95 wt % or more.

Further, the synthetic polyisoprene has a weight average molecular weight, by conversion to standard polystyrene by gel permeation chromatography, of 10,000 to 5,000,000, preferably 500,000 to 5,000,000, particularly preferably 800,000 to 3,000,000. if the synthetic polyisoprene is too small in weight average molecular weight, the obtained dip-formed article tends to fall in tensile strength, while conversely if too large, a latex of synthetic polyisoprene tends to become difficult to produce.

The synthetic polyisoprene has a polymer Mooney viscosity [$ML_{1+4}$, 100° C.] of preferably 50 to 80, more preferably 60 to 80, particularly preferably 70 to 80.

The method of production of the synthetic polyisoprene latex used in the present invention is not particularly limited, but, for example, (1) the method of emulsifying a solution or fine suspension of synthetic polyisoprene dissolved or finely dispersed in an organic solvent in the presence of a surfactant in water and, removing the organic solvent as needed, and thereby producing a synthetic polyisoprene latex and (2) the method of polymerizing isoprene alone or a mixture of isoprene and an ethylenically unsaturated monomer which can copolymerize with this by emulsion polymerization or suspension polymerization to directly produce a synthetic polyisoprene latex, may be mentioned. Among these as well, since it is possible to use synthetic polyisoprene with a high ratio of cis-bond units in the isoprene units and a dip-formed article which is superior in tensile strength can be obtained, the method of production of (1) is preferable.

For example, in the method of production of the above (1), for example, a Ziegler-based polymerization catalyst which is comprised of trialkylaluminum-titanium tetrachloride or n-butyllithium, sec-butyllithium, or other alkyl lithium polymerization catalyst is used to polymerize isoprene by solution polymerization in an inert organic solvent so as to obtain a polymerization solution of synthetic polyisoprene. Further, it is possible to use a polymerization solution of the thus obtained synthetic polyisoprene as is or to take out solid synthetic polyisoprene from the polymerization solution, then dissolve the solid synthetic polyisoprene in an organic solvent and emulsifying this in the presence of a surfactant for emulsification in water, remove the organic solvent if necessary, and thereby obtain a latex of synthetic polyisoprene. Note that, at this time, it is also possible to use a commercially available solid synthetic polyisoprene.

As the organic solvent used in the method of production of (1), for example, benzene, toluene, xylene, and other aromatic hydrocarbon solvents; cyclopentane, cyclopentene, cyclohexane, and other alicyclic hydrocarbon solvents; pentane, hexane, heptane, and other aliphatic hydrocarbon solvents; dichloromethane, chloroform, ethylene dichloride, and other halogenated hydrocarbon solvents; etc., may be mentioned. Among these, aromatic hydrocarbon solvents and alicyclic hydrocarbon solvents are preferable, alicyclic hydrocarbon solvents are more preferable, cyclohexane is particularly preferable. The amount of use of the organic solvent is preferably 2,000 parts by weight or less with respect to 100 parts by weight of the synthetic polyisoprene, more preferably 20 to 1,500 parts by weight.

As the surfactant used in the method of production of the above (1), for example, polyoxyethylene alkyl ether, polyoxyethylene alkylphenol ether, polyoxyethylene alkyl ester, polyoxyethylene sorbitan alkyl ester, and other nonionic surfactants; salts of myristic acid, palmitic acid, oleic acid, linoleic acid, and other such fatty acids, sodium dodecylbenzene sulfonate or other salts of alkylbenzene sulfonic acids, salts of higher alcohol sulfuric acid esters, salts of alkylsulfosuccinic acid, and other anionic surfactants; alkyltrimethylammonium chloride, dialkylammonium chloride, benzylammonium chloride, and other cationic surfactants may be mentioned. Note that, a sulfa ester of an α,β-unsaturated carboxylic acid, a sulfate ester of an α,β-unsaturated carboxylic acid, a sulfoalkylaryl ether, and other copolymerizable surfactants may be used. Among these as well, anionic surfactants are preferable. These surfactants may be used alone or as two types or more combined.

The amount of use of the surfactant is preferably 0.5 to 50 parts by weight with respect to 100 parts by weight of the synthetic polyisoprene, more preferably 0.5 to 40 parts by weight, still more preferably 5 to 30 parts by weight. If the amount of use of the surfactant is too small, a large amount of coagulum is liable to be formed at the time of emulsification. While conversely if too great, foaming easily occurs and the is a possibility of pinholes forming in the dip-formed article.

The amount of the water used in the method of production of (1) is preferably 50 to 5,000 parts by weight with respect to 100 parts by weight of the synthetic polyisoprene, more preferably 500 to 4,000 parts by weight. As the type of the water which is used, hard water, soft water, ion exchanged water, distilled water, zeolite water, etc. may be mentioned, and soft water, ion exchanged water, distilled water are preferable.

The device which emulsifies a solution or microsuspension of a synthetic polyisoprene which is dissolved or finely dispersed in an organic solvent in water in the presence of a surfactant can be used without particular limit so long as one which is generally commercially available as an emulsifier or disperser. Further, the method of adding the surfactant is not particularly limited, but it is possible to add it in advance in water and/or a solution or microsuspension of a synthetic polyisoprene, to add it to the emulsified liquid in the middle of the emulsification operation, to add it all together, or to add it in batches.

As the emulsification apparatus, for example, product name "Homogenizer" (made by IKA), product name "Polytron" (made by Kinematica), product name "TK Autohomomixer" (made by Tokushu Kika Kogyo), and other batch type emulsifiers; product name "TK Pipeline Homomixer" (made by Tokushu Kika Kogyo), product name "Colloid Mill" (made by Kobelco Pantech), product name "Thrasher" (made by Nippon Coke & Engineering), product name "Trigonal Wet Type Micropulverizer" (made by Mitsui Miike Koki), product name "Cavitron" (made by Eurotech), product name "Milder" (made by Pacific Machinery & Engineering), product name "Fineflow Mill" (made by Pacific Machinery and Engineering), and other continuous type emulsifiers; product name "Microfluidizer" (made by Mizuho Industrial), product name "Nanomizer" (made by Nanomizer), product name "APV Gaulin" (made by Gaulin), and other high pressure emulsifiers; product name "membrane emulsifier" (made by Reica) and other membrane emulsifiers; product name "Vibromixer" (made by Reica) and other vibration type emulsifiers; product name "ultrasonic homogenizer" (made by Branson) and other ultrasonic emulsifiers; etc. may be mentioned. Note that, the conditions of the emulsification operation by the emulsification apparatus are not particularly limited. It is sufficient to suitably select the treatment temperature, treatment time, etc. so as to obtain the desired dispersed state.

In the method of manufacture of the above (1), it is preferable to remove the organic solvent from the emulsion which is obtained through the emulsification operation. As the method of removing an organic solvent from an emulsion, making the content of the organic solvent (preferably alicyclic hydrocarbon solvent) in the latex of the obtained synthetic polyisoprene 500 weight ppm or less is preferable. Vacuum distillation, ordinary pressure distillation, steam distillation, centrifugation, and other methods can be employed.

The solid content concentration of the synthetic polyisoprene latex used in the present invention is preferably 30 to 70 wt %, more preferably 40 to 70 wt %. By making the solid content concentration the above range, it is possible to suitably keep the synthetic polyisoprene particles from coagulating and coarse coagulum from being formed.

Further, the synthetic polyisoprene particles which are contained in the synthetic polyisoprene latex used in the present invention has a volume average particle size of preferably 0.05 to 3 µm, more preferably 0.2 to 2 µm. If the volume average particle size is too small, the latex viscosity ends up becoming too high and the handling ability is liable to end up deteriorating. On the other hand, if the volume average particle size is too large, when storing the synthetic polyisoprene latex, a film ends up forming on the latex surface and the handling ability is liable to end up deteriorating.

Further, the synthetic polyisoprene latex used in the present invention may contain, to an extent not detracting from the effects of the present invention, a pH adjuster, defoamer, preservative, cross-linking agent, chelating agent, oxygen scavenger, dispersant, and other additives. As the pH adjuster, for example, sodium hydroxide, potassium hydroxide, and other hydroxides of alkali metals; sodium carbonate, potassium carbonate, and other carbonates of alkali metals; sodium hydrogen carbonate, and other hydrogen carbonates of alkali metals; ammonia; trimethylammonium, triethanolamine, and other organic amine compounds; etc. may be mentioned.

Polycarboxylic Acid and/or Salt of Polycarboxylic Acid

The dip-forming composition of the present invention contains a polycarboxylic acid and/or a salt of a polycarboxylic acid. The polycarboxylic acid and/or salt of a polycarboxylic acid acts as a dispersant in the dip-forming composition of the present invention. In the present invention, by mixing in a polycarboxylic acid and/or salt of a polycarboxylic acid, it is possible to suppress the formation of coarse coagulum during aging and possible to obtain a dip-formed article which is excellent in tensile strength and elongation even if making the aging temperature relatively low and making the aging time relatively short. Further, a polycarboxylic acid and/or salt of a polycarboxylic acid does not contain any protein causing allergic reactions at the human body, so the obtained dip-formed article can be made one which exhibits excellent safety even when used in contact with the human body.

As the polycarboxylic acid used in the present invention, for example, a homopolymer of an $\alpha,\beta$-unsaturated carboxylic acid-based monomer or a copolymer of an $\alpha,\beta$-unsaturated carboxylic acid-based monomer and an ethylenically unsaturated monomer which can copolymerize with this etc. may be mentioned. Note that, the above (co)polymers (indicating "homopolymers" and "copolymers", same below) include ones where the $\alpha,\beta$-unsaturated carboxylic acid-based monomer units in the (co)polymer are acid anhydrides in form.

Further, the salt of the polycarboxylic acid used in the present invention is one obtained by at least part of the carboxyl groups or acid anhydride groups which are present in these (co)polymers forming a salt. Note that, as the salt of the polycarboxylic acid used in the present invention, a sodium, potassium, and other alkali metal salt; magnesium salt; calcium, barium, and other alkali earth metal salt; and further an ammonium salt, amine salt, etc. may be mentioned, but among these, a metal salt is preferable, an alkali metal salt is more preferable, and a sodium salt is furthermore preferable. By making it a metal salt, it is possible to reduce the odor due to the volatile ingredients.

Note that, among a polycarboxylic acid and salt of a polycarboxylic acid, a salt of a polycarboxylic acid is preferable.

An $\alpha,\beta$-unsaturated carboxylic acid-based monomer is an unsaturated carboxylic acid which has a carboxyl group or acid anhydride group or its anhydride. As specific examples, acrylic acid, methacrylic acid, maleic acid, fumaric acid, itaconic acid, maleic acid anhydride, itaconic acid anhydride, citraconic acid anhydride, etc. may be mentioned.

Further, as the ethylenically unsaturated monomer which can copolymerize with an $\alpha,\beta$-unsaturated carboxylic acid-based monomer, for example, a $C_2$ to $C_{10}$ olefin, aromatic vinyl-based monomer, vinyl ether-based monomer, acrylic acid alkyl ester-based monomer, etc. may be mentioned.

As specific examples of the $C_2$ to $C_{10}$ olefin, ethylene, propylene, butene, 2-methyl-butene-1,2-methyl-butene-2, hexane, octane, isoamylene, diisobutylene, decene, cyclopentene, cyclohexene, etc. may be mentioned.

As specific examples of the aromatic vinyl-based monomer, styrene, vinyltoluene, α-methylstyrene, coumarone, indene, etc. may be mentioned.

As specific examples of the vinyl ether-based monomer, methylvinyl ether etc. may be mentioned.

As specific examples of the acrylic acid alkyl ester-based monomer, ethyl acrylate, methyl methacrylate, etc. may be mentioned.

In the polycarboxylic acid and/or salt of a polycarboxylic acid used in the present invention, the ratio of content of the α,β-unsaturated carboxylic acid-based monomer units is preferably 70 to 100 wt % in the total monomer units, more preferably 90 to 100 wt %, particularly preferably 100 wt % (homopolymer of α,β-unsaturated carboxylic acid-based monomer or its salt) since the effect of the present invention becomes much more remarkable. Further, as the α,β-unsaturated carboxylic acid-based monomer, acrylic acid and methacrylic acid are preferable, while methacrylic acid is particularly preferable. That is, as the polycarboxylic acid and/or salt of a polycarboxylic acid, a homopolymer of methacrylic acid and/or a salt of a homopolymer of methacrylic acid is preferable.

Further, the method of production of the polycarboxylic acid and/or salt of a polycarboxylic acid used in the present invention is not particularly limited, but the method of using a known polymerization method to polymerize an α,β-unsaturated carboxylic acid-based monomer and an ethylenically unsaturated monomer which can copolymerize with this and is used in accordance with need may be mentioned. Further, when using a salt of a polycarboxylic acid, the (co)polymer which is obtained by polymerization can be made to react with a base to neutralize the carboxyl groups and thereby convert the structure to a salt. The base which is used in this case is not particularly limited, but sodium hydroxide, potassium hydroxide, and other hydroxides of an alkali metal; sodium carbonate, potassium carbonate, and other carbonates of an alkali metal; sodium hydrogen carbonate and other hydrogen carbonates of an alkali metal; ammonia; trimethylammonium, triethanolamine, and other organic amine compounds; etc. may be mentioned.

Further, the polymerization method when polymerizing an α,β-unsaturated carboxylic acid-based monomer and an ethylenically unsaturated monomer which can copolymerize with this and is used in accordance with need is not particularly limited, but the emulsion polymerization method, microsuspension polymerization method, etc. may be mentioned, but among these, the microsuspension polymerization method is preferable.

Note that, as the polymerization initiator which is used for polymerization, any of an oil-soluble polymerization initiator or water-soluble polymerization initiator can be used, but since the effect of the present invention becomes much more remarkable, an oil-soluble polymerization initiator is preferably used. As such an oil-soluble polymerization initiator, an organic peroxide, azo compound, etc. may be mentioned.

As the organic peroxide, for example, 3,5,5-trimethylhexanoyl peroxide, lauroyl peroxide, benzoyl peroxide, and other diacyl peroxides; methylethylketone peroxide and other ketone peroxides; benzoyl hydroperoxide, cumen hydroperoxide, p-cymene hydroperoxide, 1,1,3,3-tetramethylbutyl hydroperoxide, 2,5-dimethylhexane-2,5-dihydroperoxide, and other hydroperoxides; t-butylperoxypivalate, and other peroxy esters; diisopropylperoxy dicarbonate, di-2-ethylhexylperoxy dicarbonate, and other peroxy di carbonates; etc. may be mentioned. As the azo compound, 2,2-azobisisobutyronitrile, 2,2-azobis(2-methylbutyronitrile), 2,2-azobis(2,4-dimethylvaleronitrile), 2,2-azobis(4-methoxy-2,4-dimethylvaleronitrile), etc. may be mentioned.

Further, as the water soluble polymerization initiator, potassium persulfate, ammonium persulfate, etc. may be mentioned.

Further, at the time of polymerization, a reducing agent is preferably used. As the reducing agent, in general, a peroxide, preferably one which can be used as a redox catalyst in combination with an organic peroxide, can be suitably used. As specific examples of the reducing agent, sodium formaldehyde sulfoxylate (SFS), hydrosulphite, dimethylamine, ascorbic acid, sucrose, ferrous sulfate, etc. may be mentioned. These may be used alone or as two types or more combined.

The polycarboxylic acid and/or salt of a polycarboxylic acid used in the present invention has a weight average molecular weight of preferably 1,000 to 300,000, more preferably 50,000 to 300,000, furthermore preferably 100,000 to 300,000. By making the weight average molecular weight the above range, its action and effect can be made more remarkable.

Further, in the salt of the polycarboxylic acid used in the present invention, the neutralization rate of the carboxyl groups (rate of conversion to salt structure) is preferably 70% or more, more preferably 80% or more, furthermore preferably 100%.

In the dip-forming composition of the present invention, the content of the polycarboxylic acid and/or salt of a polycarboxylic acid is not particularly limited, but is preferably 0.01 to 20 parts by weight with respect to 100 parts by weight of the synthetic polyisoprene, more preferably 0.1 to 10 parts by weight, furthermore preferably 0.2 to 5 parts by weight. If the amount of the polycarboxylic acid and/or salt of a polycarboxylic acid is too small, the effect of addition sometimes becomes hard to obtain. On the other hand, if too large, the viscosity of the dip-forming composition rises, so sometimes control of the film thickness at the time of dip-forming becomes difficult.

Sulfur-Based Vulcanizer

As the sulfur-based vulcanizer used in the present invention, for example, powdered sulfur, flower of sulfur, precipitated sulfur, colloidal sulfur, surface-treated sulfur, insoluble sulfur, and other sulfurs; sulfur chloride, sulfur dichloride, morpholine disulfide, alkylphenol disulfide, N,N'-di thio-bis(hexahydro-2H-azenopine-2), phosphorus-containing polysulfide, high molecular weight polysulfide, 2-(4'-morpholinodithio)benzothiazole, and other sulfur-containing compounds; etc. may be mentioned. These sulfur-based vulcanizers may be used as single types alone or as two types or more together.

In the dip-forming composition of the present invention, the content of the sulfur-based vulcanizer is not particularly limited, but is preferably 0.1 to 10 parts by weight with respect to 100 parts by weight of the synthetic polyisoprene, more preferably 0.2 to 3 parts by weight. If this amount is in this range, the dip-formed article is further improved in tensile strength.

Vulcanization Accelerator

As the vulcanization accelerator, a vulcanization accelerator which is usually used in dip-forming may be used without limitation. As the vulcanization accelerator, for example, diethyldithiocarbamic acid, dibutyldithiocarbamic acid, di-2-ethylhexyldithiocarbamic acid, dicyclohexyldithiocarbamic acid, diphenyldithiocarbamic acid, dibenzyldithiocarbamic acid, and other dithiocarbamic acids and their zinc salts; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio carbarylthio)benzothiazole, 2-(2,6-dimethyl-4-morpholinothio)benzothiazole, 2-(4'-morpholino dithio)benzothiazole, 4-morpholinyl-2-benzothiazyl disulfide, 1,3-bis(2-benzothiazyl mercaptomethyl) urea, etc. may be mentioned. Among these as well, zinc diethyldithiocarbamate, zinc dibutyldithiocarbamate, 2-mercaptobenzothiazole, and zinc 2-mercaptobenzothiazole are preferable. These vulcanization accelerators may be used as single type alone or as two types or more combined.

In the dip-forming composition of the present invention, the content of the vulcanization accelerator is not particularly limited, but is preferably 0.05 to 5 parts by weight with respect to 100 parts by weight of the synthetic polyisoprene, more preferably 0.1 to 2 parts by weight. If this amount is too small, the dip-formed article sometimes falls in tensile strength. Further, if this amount is too great, the dip-formed article sometimes falls in elongation and tensile strength.

Other Compounding Agents

The dip-forming composition of the present invention preferably further contains zinc oxide.

In the dip-forming composition of the present invention, the content of the zinc oxide is not particularly limited, but is preferably 0.1 to 5 parts by weight with respect to 100 parts by weight of the synthetic polyisoprene, more preferably 0.2 to 2 parts by weight. If this amount is too small, the dip-formed article tends to fall in tensile strength, while conversely if too large, the stability of the synthetic polyisoprene particles in the dip-forming composition sometimes falls and coarse coagulum sometimes forms.

Further, the dip-forming composition of the present invention may further contain an antiaging agent; carbon black, silica, talc, and other reinforcing agent; calcium carbonate, clay, and other filler; ultraviolet absorber; plasticizer; and other compounding agents in accordance with need.

As the antiaging agent, 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenate phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, butylated reaction products of p-cresol and dicyclopentadiene, or other phenol-based antiaging agents not containing sulfur atoms; 2,2'-thiobis-(4-methyl-6-t-butylphenol), 4,4'-thiobis-(6-t-butyl-o-cresol), 2,6-di-t-butyl-4-(4,6-bis(octylthio)-1,3,5-triazin-2-ylamino)phenol, or other thiobisphenol-based antiaging agents; tris(nonylphenyl)phosphite, diphenylisodecylphosphite, tetraphenyldipropyleneglycol diphosphite, or other phosphorous acid ester-based antiaging agents; dilauryl thiodipropionate or other sulfur ester-based antiaging agents; phenyl-α-naphthylamine, phenyl-(β-naphthylamine, p-(p-toluenesulfonylamide)-diphenylamine, 4,4'-(α-α-dimethylbenzyl)diphenylamine N,N-diphenyl-p-phenylenediamine, N-isopropyl-N'-phenyl-p-phenylenediamine, butylaldehyde-aniline condensates or other amine-based antiaging agents; 6-ethoxy-2,2,4-trimethyl-1,2-dihydroguinoline or other quinoline-based antiaging agents; 2,5-di-(t-amyl) hydroquinone or other hydroquinone-based antiaging agents; etc. may be mentioned. These antiaging agents may be used as single type alone or as two types or more together.

In the dip-forming composition of the present invention, the content of the antiaging agent is preferably 0.05 to 10 parts by weight with respect to 100 parts by weight of the synthetic polyisoprene, more preferably 0.1 to 5 parts by weight. If this amount is too small, the synthetic polyisoprene sometimes deteriorates. Further, if this amount is too large, the dip-formed article sometimes falls in tensile strength.

Preparation of Dip-Forming Composition

The method of preparation of the dip-forming composition of the present invention is not particularly limited. For example, the method of using a ball mill, kneader, disperser, or other dispersion machine to mix, into the synthetic polyisoprene latex, the sulfur-based vulcanizer, vulcanization accelerator, and ingredients which are mixed in accordance with need such as zinc oxide, an antiaging agent, or other compounding agents, the method of using the above-mentioned dispersion machine to prepare an aqueous dispersion of desired ingredients other than the synthetic polyisoprene latex, then mixing the aqueous dispersion in the synthetic polyisoprene latex, etc. may be mentioned.

The dip-forming composition of the present invention has a pH, from the viewpoint of the stability of the dip-forming composition, of preferably 7 or more, more preferably has a pH of 8 to 12 in range. Further, the dip-forming composition of the present invention has a solid content concentration of preferably 15 to 65 wt % in range since the control of the film thickness at the time of dip-forming becomes excellent.

The dip-forming composition of the present invention is preferably aged (also called "prevulcanization") before being used for dip-forming. By the prevulcanization, a dip-formed article which is excellent in tensile strength and can be detached from the later explained mold is obtained. The time of prevulcanization is not particularly limited and also depends on the prevulcanization temperature, but is preferably 1 to 40 hours, more preferably 5 to 35 hours, furthermore preferably 10 to 30 hours. Further, the prevulcanization temperature is preferably 10 to 40° C., more preferably 20 to 30° C. The dip-forming composition of the present invention contains the above-mentioned ingredients, so as explained above, even if the aging temperature is made relatively low and the aging time is made relatively short, a dip-formed article which is excellent in tensile strength and elongation can be given.

Further, after prevulcanization until being used for dip-forming, the composition is preferably stored at 10 to 30° C. in temperature. If stored as is at a high temperature, sometimes the obtained dip-formed article falls in tensile strength.

Dip-Formed Article

The dip-formed article of the present invention is obtained by dip-forming the dip-forming composition of the present invention.

Dip-forming is the method of dipping a mold in the dip-forming composition, depositing the composition on the surface of the mold, then pulling up the mold from the composition, then drying the composition deposited on the surface of the mold. Note that, the mold may also be preheated before being dipped in the dip-forming composition. Further, before dipping the mold in the dip-forming composition or after pulling up the mold from the dip-forming composition, it is possible to use a coagulating agent in accordance with need.

As specific examples of the method of use of a coagulating agent, there are the method of dipping a mold before dipping in the dip-forming composition in a solution of a coagulating agent to deposit the coagulating agent on the mold (anode coagulant dipping method), the method of dipping a mold on which the dip-forming composition is deposited in a coagulating agent solution (teague coagulant dripping method), etc., but the anode deposition dipping method is preferable on the point of a dip-formed article with little unevenness of thickness being obtained.

As specific examples of the coagulant, barium chloride, calcium chloride, magnesium chloride, zinc chloride, aluminum chloride, or other metal halides; barium nitrate, calcium nitrate, zinc nitrate, or other nitrates; barium acetate, calcium acetate, zinc acetate, or other acetates; calcium sulfate, magnesium sulfate, aluminum sulfate, or other sulfates; or other water-soluble polyvalent metal salts. Among these, a calcium salt is preferable, and calcium nitrate is more preferable.

These water-soluble polyvalent metal salts may be used as single type alone or as two types or more together.

The coagulating agent is preferably used in the state of an aqueous solution. This aqueous solution may further contain methanol, ethanol, or other water-soluble organic solvent or a nonionic surfactant. The concentration of the coagulating agent may differ depending on the type of the water-soluble polyvalent metal salt, but is preferably 5 to 50 wt %, more preferably 10 to 30 wt %.

The mold is pulled up from the dip-forming composition, then usually is heated to make the deposit which is formed on the mold dry. The drying conditions may be suitably selected.

Next, this is heated to vulcanize the deposit which is formed on the mold. The heating conditions at the time of vulcanization are not particularly limited, but are preferably 60 to 150° C., more preferably 100 to 130° C. of heating temperature and preferably 10 to 120 minutes of heating time. The method of heating is not particularly limited, but there is the method of heating in an oven by warm air, the method of irradiating infrared rays for heating, etc.

Further, before heating or after heating the mold on which the dip-forming composition is deposited, the water-soluble impurities (for example, excess surfactant or coagulating agent) are preferably removed by washing the mold by water or warm water. The warm water which is used is preferably 40° C. to 80° C., more preferably 50° C. to 70° C.

The vulcanized dip-formed article is detached from the mold. As specific examples of the detachment method, there is the method of peeling the article off from the mold by hand, the method of peeling it off by water pressure or compressed air pressure, etc. If the dip-formed article in the middle of vulcanization has sufficient strength for detachment, it may be detached in the middle of vulcanization and then the vulcanization continued.

The dip-formed article of the present invention is excellent in tensile strength and elongation, so is preferably used for gloves. When the dip-formed article is a glove, to prevent dip-formed articles from sticking to each other at the contacting surfaces and improve the slip at the time of attachment and detachment, talc, calcium carbonate, or other inorganic microparticles or starch particles or other organic microparticles may be sprinkled over the glove surface, an elastomer layer which contains microparticles may be formed on the glove surface, or the surface layer of the glove may be chlorinated.

The dip-formed article of the present invention can be used not only for the above gloves, but also nipples for nursing bottles, droppers, tubes, water pillows, balloon sacks, catheters condoms, and other medical products; balloons, dolls, balls, or other toys; press molding bags, gas storing bags, or other industrial products; finger sacks etc.

EXAMPLES

Below, the present invention will be explained based on further detailed examples, but the present invention is not limited to these embodiments. Note that, below, "parts" are based on weight unless otherwise indicated. Further, the tests and evaluation were as follows.

Weight Average Molecular Weight of Polyisoprene 0.1 g of polyisoprene was dissolved in 50 g of tetrahydrofuran to prepare a 0.2 wt % measurement solution. Next, the measurement solution was filtered by a disk filter with a pore size of 0.45 μm and was measured by a HLC-8220GPC (made by Toso). Further, the obtained results were compared against a calibration line which was prepared using polystyrene as a standard sample to find the weight average molecular weight of the polyisoprene. Note that, the GPC was measured with the following equipments and conditions.

GPC system: HLC-8220GPC (made by Toso)
Guard column: product name "TSKGUARD COLUMN SUPER HZ-L 4.6×35", made by Toso
Measurement column: product name "TSK-GET, SUPER EM-H 6.0×150", made by Toso
Column temperature: 40° C.
Solvent: tetrahydrofuran
Flow rate: 0.3 ml/min
Detector: RI (polarity (+))

Weight Average Molecular Weight of Sodium Salt of Polymethacrylic Acid 0.1 g of a sodium salt of a polymethacrylic acid was dissolved in 200 mM sodium phosphate buffer (pH=7) 5 ml to prepare a measurement solution. Note that, as the 200 mM sodium phosphate buffer, one in which 37.02 g of sodium di hydrogen-phosphate (anhydrous) and 42.60 g of disodium hydrogen-phosphate (anhydrous) were dissolved in 3 liters of ultrapure water was used. Next, the measurement solution was filtered by a disk filter with a pore size of 0.45 μm (product name "Millex LH", made by Millipore), then was measured by water-soluble GPC (gel permeation chromatograph). Further, the obtained results were compared against a calibration line which was prepared using product name "TSK standard polyethylene oxide" (made by Toso), polyethylene glycol (made by Wako Pure Chemicals), and polyethylene glycol (made by Kanto Kagaku) as standard samples to find the weight average molecular weight of the sodium salt of a polymethacrylic acid. Note that, the water-soluble GPC was measured with the following equipments and conditions.

Water-soluble GPC system: product name "2695 (Separation Module)", made by Waters
Guard column: product name "SHODEX OHpack SB-G", made by Showa Denko
Measurement column: product name "TSKgel GMPW", made by Toso, two columns used connected in series
Column temperature: 40° C.
Solvent: 200 mM sodium phosphate buffer (pH=7)
Flow rate: 0.5 ml/min
Detector: product name "2414 (Refractive Index Detector)", made by Waters
Injection amount: 50 μl Tensile Strength and Elongation of Dip-Formed Article The tensile strength and elongation of the dip-formed article were measured based on ASTM D412.

The film-shaped dip-formed article was punched by a dumbbell die (product name "Super Dumbbell (model: SDMK-100C)", made by Dumbbell Co., Ltd.) to prepare a test piece for measurement of tensile strength. The test piece was tested by a tensilon universal tester (product name "RTG-1210", made by Orientech) at a tensile speed of 500 mm/min and measured for tensile strength right before break (units: MPa) and elongation right before break (units: %).

Amount of Coagulum in Dip-Forming Composition (Filtered by 200 Mesh)

A 200 mesh stainless steel wire mesh measured for weight in advance (weight: C) was used to filter the dip-forming composition (solid content concentration: D wt %, weight: E). This wire mesh was made to dry in a 105° C. dryer for 2 hours or more, then the weight of the wire mesh after drying (weight: F) was measured. Next, the amount of coagulum in the dip-forming composition (wt %) was found in accordance with the following formula:

Amount of coagulum=[$(F-C)/(D \times E)$]×10000 (wt %)

Manufacturing Example 1

Manufacture of Synthetic Polyisoprene Latex

Weight average molecular weight 1,300,000 synthetic polyisoprene (product name "NIPOL IR2200L", made by Zeon Corporation, homopolymer of isoprene, amount of cis bond units: 98%) was mixed with cyclohexane and stirred while raising the temperature to 60° C. to dissolve to prepare a cyclohexane solution (a) of polyisoprene with a viscosity measured by a B-type viscometer of 12,000 mPa·s (solid content concentration: 8 wt. %).

On the other hand, separate from the above, 10 parts of sodium rosinate and 5 parts of sodium dodecylbenzene sulfonate were mixed with water to prepare an anionic surfactant aqueous solution (b) containing a mixture, by weight ratio, of sodium rosinate/sodium dodecylbenzene sulfonate=2/1 at a concentration of 1.5 wt. % at a temperature of 60° C.

Next, the above cyclohexane solution (a) and above anionic surfactant aqueous solution (b) were mixed to give a weight ratio of 1:1.5 using a product name "Multiline Mixer MS26-MMR-5.51," (made by Satake Chemical Equipment Mfg), then product name "Milder MDN310" (made by Pacific Machinery & Engineering) was used to mix and emulsify this at 4100 rpm to obtain an emulsified liquid (c). Note that, at this time, the feed rate of the total of the cyclohexane solution (a) and the anionic surfactant aqueous solution (b) was made 2,000 kg/hr, the temperature was made 60° C., and the back pressure (gauge pressure) was made 0.5 MPa.

Next, the above obtained emulsified liquid (c) was warmed under a reduced pressure of −0.01 to −0.09 MPa (gauge pressure) to 80° C. and the cyclohexane was distilled off to obtain an aqueous dispersion (d) of synthetic polyisoprene. At this time, as a defoamer, product name "SM5515" (made by Toray-Dow Corning) was used and sprayed to continuously add it to give an amount of 300 weight ppm with respect to the synthetic polyisoprene in the emulsified liquid (c). Note that, when distilling off the cyclohexane, the emulsified liquid (c) was adjusted to become 70 vol % or less of the volume of the tank and stirring blades of three-stage pitched paddle blades were used to gently stir this at 60 rpm.

Further, after cyclohexane finished being distilled off, the obtained aqueous dispersion (d) was centrifuged using a continuous centrifuge (product name "SRG510", made by Alfa Laval) at 4,000 to 5,000 G to obtain a light solution constituted by a solid content concentration 56 wt % synthetic polyisoprene latex (e). Note that, the conditions at the time of centrifugation were a solid content concentration of the aqueous dispersion (d) before centrifugation of 10 wt %, a flow rate at the time of continuous centrifugation of 1300 kg/hr, and a back pressure (gauge pressure) of the centrifuge of 1.5 MPa.

The obtained synthetic polyisoprene latex (e) had a solid content concentration of 56 wt %, a volume average particle size of 1.0 μm, a pH=10, a viscosity measured by a B-type viscometer of 120 mPa·s, a total content of anionic surfactant of 3.0 parts with respect to 100 parts of synthetic polyisoprene, and a content of cyclohexane of 10 ppm. Further, no coagulum was observed in the latex (e).

Manufacturing Example 2

Manufacture of Sodium Salt of Polymethacrylic Acid 110 parts of distilled water and 5 parts of methacrylic acid were charged into a nitrogen-substituted polymerization reaction vessel equipped with a stirrer and stirred while warming to a temperature of 30° C. Further, a separate container from the above was used to prepare a solution comprised of 7 parts of distilled water, 0.32 part of sodium formaldehyde sulfoxylate (product name "SFS", made by Mitsubishi Gas Chemical), and 0.01 part of ferrous sulfate (product name: "Frost Fe", made by Chubu Chelest). Further, this solution was added to a polymerization reaction vessel, then 0.5 part of 1,1,3,3-tetramethylbutylhydroperoxide (product name "Perocta H", made by NOF) was added for a reaction at 30° C. for 1 hours and further a reaction at 70° C. for 2 hours. After the reaction, the solution was concentrated by a rotary evaporator and adjusted in pH to 10 by adding 5% sodium hydroxide to obtain an aqueous solution of a sodium salt of polymethacrylic acid. The obtained aqueous solution of the sodium salt of a polymethacrylic acid had a solid content concentration of 11 wt %, a pH of 10, a viscosity measured by a B-type viscometer of 13 mPa·s, and a weight average molecular weight of the sodium salt of a polymethacrylic acid measured in accordance with the above method of 110,000.

Example 1

Dip-Forming Composition

While stirring 178.6 parts of the latex of synthetic polyisoprene (e) which was obtained in Manufacturing Example 1 (converted to synthetic polyisoprene, 100 parts), 4.5 parts of an aqueous solution of a sodium salt of polymethacrylic acid which was obtained in Manufacturing Example 2 (converted to sodium polymethacrylate, 0.5 part) was added. Next, while stirring the mixture, aqueous dispersions of the different compounding agents were added to 100 parts by weight of the synthetic polyisoprene in the mixture to give, converted to solid content, 1.5 parts of sulfur, 1.5 parts of zinc oxide, 0.5 part of zinc dibutyldithiocarbamate, 0.3 part of zinc diethyldithiocarbamate, and 0.7 part of zinc 2-mercaptobenzothiazole, then a potassium hydroxide aqueous solution was added to obtain a dip-forming composition (f) adjusted in pH to 10.5.

After that, the obtained dip-forming composition (f) was aged in a 25° C. thermostatic bath for 24 hours. Further, the 24 hour aged dip-forming composition (f) was measured for the amount of coagulum (wt %) in accordance with the above-mentioned method. The results are shown in Table 1.

(Dip-Formed Article)

A glass mold frosted on its surface (diameter about 5 cm, frosted part length about 15 cm) was washed and preheated in a 70° C. oven, then it was dipped in a coagulant aqueous solution comprised of 18 wt % of calcium nitrate and 0.05 wt % of polyoxyethylene lauryl ether (product name "Emulgen 109P", made by Mao Corporation) for 5 seconds and then taken out Next, the glass mold which was covered by a coagulant was dried in a 70° C. oven. After that, the glass mold which was covered by a coagulant was taken out from the oven, dipped in the dip-forming composition (f) which was adjusted to 25° C. for 10 seconds, then taken out and dried at room temperature for 60 minutes to obtain a glass mold which was covered by a film. Further, this film covered glass mold was dipped in 60° C. warm water for 2 minutes, then was dried at room temperature for 30 minutes. After that, this film covered glass mold was placed in a 120° C. oven then the film was vulcanized for 20 minutes. The glass mold which was covered by the vulcanized film was cooled to room temperature, then dusted with talc, then the film was peeled off from the glass mold. Further, the obtained film (dip-formed article) was measured for tensile strength and elongation. The results are shown in Table 1.

Example 2

Except for changing the amount of the aqueous solution of a sodium salt of polymethacrylic acid which was obtained at the Manufacturing Example 2 when preparing the dip-forming composition from 4.5 parts to 9 parts (converted to a sodium salt of a polymethacrylic acid, 1 part), the same procedure was followed as in Example 1 to obtain a dip-forming composition and film (dip-formed article) and the same procedure was followed to evaluate them. The results are shown in Table 1.

Example 3

Except for changing the amount of the aqueous solution of a sodium salt of polymethacrylic acid which was obtained at the Manufacturing Example 2 when preparing the dip-forming composition from 4.5 parts to 18 parts (converted to a sodium salt of a polymethacrylic acid, 2 parts), the same procedure was followed as in Example 1 to obtain a dip-forming composition and film (dip-formed article) and the same procedure was followed to evaluate them. The results are shown in Table 1.

Comparative Example 1

Except for not mixing in an aqueous solution of a sodium salt of polymethacrylic acid which was obtained at the Manufacturing Example 2 when preparing the dip-forming composition, the same procedure was followed as in Example 1 to obtain a dip-forming composition and film (dip-formed article) and the same procedure was followed to evaluate them. The results are shown in Table 1.

Comparative Example 2

Except for changing the temperature when aging the dip-forming composition to 35° C., the same procedure was followed as in Comparative Examples 1 to obtain a dip-forming composition and film (dip-formed article) and the same procedure was followed to evaluate them. The results are shown in Table 1.

Comparative Example 3

Except for using 2 parts of sodium dodecylbenzene sulfonate instead of an aqueous solution of a sodium salt of polymethacrylic acid which was obtained at the Manufacturing Example 2 when preparing a dip-forming composition and changing the temperature when aging the dip-forming composition to 30° C., the same procedure was followed as in Example 1 to obtain a dip-forming composition and film (dip-formed article) and the same procedure was followed to evaluate them. The results are shown in Table 1.

TABLE 1

| | | Example | | | Comparative Example | | |
|---|---|---|---|---|---|---|---|
| | | 1 | 2 | 3 | 1 | 2 | 3 |
| Composition of dip-forming composition | | | | | | | |
| Synthetic polyisoprene | (parts) | 100 | 100 | 100 | 100 | 100 | 100 |
| Sodium salt of polymethacrylic acid | (parts) | 0.5 | 1 | 2 | — | — | — |
| Sodium dodecylbenzene sulfonate | (parts) | — | — | — | — | — | 2 |
| Sulfur | (parts) | 1.5 | 1.5 | 1.5 | 1.5 | 1.5 | 1.5 |
| Zinc oxide | (parts) | 1.5 | 1.5 | 1.5 | 1.5 | 1.5 | 1.5 |
| Zinc dibutyldithiocarbamate | (parts) | 0.5 | 0.5 | 0.5 | 0.5 | 0.5 | 0.5 |
| Zinc diethyldithiocarbamate | (parts) | 0.3 | 0.3 | 0.3 | 0.3 | 0.3 | 0.3 |
| 2-mercaptobenzothiazole zinc salt | (parts) | 0.7 | 0.7 | 0.7 | 0.7 | 0.7 | 0.7 |
| Prevulcanization conditions | | | | | | | |
| Prevulcanization temperature | (° C.) | 25 | 25 | 25 | 25 | 35 | 30 |
| Prevulcanization time | (h) | 24 | 24 | 24 | 24 | 24 | 24 |
| Evaluation | | | | | | | |
| Amount of coagulum of dip-forming composition | (wt %) | 0.05 | 0.01 | 0.01 | 1.04 | 2.90 | 0.15 |
| Tensile strength of dip-formed article | (MPa) | 10 | 13 | 15 | Unable to be removed from mold | 9 | Unable to be removed from mold |
| Elongation of dip-formed article | (%) | 1300 | 1200 | 1100 | | 1200 | |

As shown in Table 1, a dip-forming composition containing a weight average molecular weight 10,000 to 5,000,000 synthetic polyisoprene latex to which a sulfur-based vulcanizer and vulcanization accelerator plus a sodium salt of a polycarboxylic acid have been added is reduced in formation of coagulum after aging (prevulcanization) and further can give a dip-formed article which is excellent in tensile strength and elongation even if making the aging conditions a relatively low temperature and short time of 25° C. and 24 hours (Examples 1 to 3).

On the other hand, when a sodium salt of a polycarboxylic acid is not added, the formation of coagulum after aging (prevulcanization) becomes greater, it is necessary to make the temperature at the time of aging a high 35° C. in order to obtain a dip-formed article which has a strength sufficient to enable detachment from the mold and the productivity becomes inferior (Comparative Examples 1 and 2).

Further, even when using sodium dodecylbenzene sulfonate instead of a sodium salt of a polycarboxylic acid, formation of coagulum after aging (prevulcanization) became greater and further a dip-formed article which has a strength sufficient to enable detachment from the mold could not be obtained even if making the temperature at the time of aging a high 30° C. (Comparative Example 3).

The invention claimed is:

1. A dip-forming composition containing a latex of synthetic polyisoprene having a weight average molecular weight of 10,000 to 5,000,000, a homopolymer of a methacrylic acid and/or metal salt of a homopolymer of a methacrylic acid, a sulfur-based vulcanizer, and a vulcanization accelerator.

2. The dip-forming composition according to claim 1 wherein the polycarboxylic acid and/or salt of a polycarboxylic acid is a polymer which is polymerized using an oil-soluble polymerization initiator or salt of the polymer.

3. The dip-forming composition according to claim 1, wherein the metal salt is a sodium salt.

4. The dip-forming composition according to claim 1 wherein the homopolymer of the methacrylic acid and/or metal salt of the homopolymer of the methacrylic acid has a weight average molecular weight of 1,000 to 300,000.

5. The dip-forming composition according to claim 1 wherein a content of the homopolymer of the methacrylic acid and/or metal salt of the homopolymer of the methacrylic acid is 0.01 to 20 parts by weight with respect to 100 parts by weight of the synthetic polyisoprene.

6. The dip-forming composition according to claim 1 further containing zinc oxide.

7. A dip-formed article obtained by dip-forming the dip-forming composition according to claim 1.

* * * * *